US006929230B2

(12) United States Patent
Tsai

(10) Patent No.: US 6,929,230 B2
(45) Date of Patent: Aug. 16, 2005

(54) MULTI-PURPOSE FOLDABLE FRAME

(76) Inventor: Ming-Liang Tsai, 4F-3, Fu-Chin St., Song Shan Dist., Taipei (TW)

( * ) Notice: Subject to any disclaimer, the term of this patent is extended or adjusted under 35 U.S.C. 154(b) by 54 days.

(21) Appl. No.: 10/686,650

(22) Filed: Oct. 17, 2003

(65) Prior Publication Data

US 2005/0082442 A1 Apr. 21, 2005

(51) Int. Cl.[7] .............................................. F16M 11/38
(52) U.S. Cl. ...................... 248/436; 248/166; 248/129; 108/67
(58) Field of Search ................................ 248/164, 431, 248/432, 436, 166, 188.5, 129; 108/115, 108/166, 118, 120, 157.15, 162, 157.16, 176; 297/16.2, 45, 46, 42, 56, 16.1, 59, 452.18, 297/24, 25; 280/650, 657, 47.4, 649; 211/200

(56) References Cited

U.S. PATENT DOCUMENTS 4,739,527 A * 4/1988 Kohus et al. ................. 5/99.1
4,779,635 A * 10/1988 Lynch ......................... 135/97
6,237,993 B1 * 5/2001 Zheng ........................ 297/16.2
6,302,479 B1 * 10/2001 Zheng ........................ 297/16.2
6,354,619 B1 * 3/2002 Kim ........................... 280/651
6,382,729 B1 * 5/2002 Wu ....................... 297/452.41

FOREIGN PATENT DOCUMENTS

| | | | | |
|---|---|---|---|---|
| CA | 2354363 | * | 1/2003 | ............ A47C 4/00 |
| JP | 2002233429 A | * | 8/2002 | ............ A47C 5/10 |
| JP | 2003189968 A | * | 7/2003 | ............ A47C 4/28 |

* cited by examiner

*Primary Examiner*—Gwendolyn Baxter
(74) *Attorney, Agent, or Firm*—Rosenberg, Klein & Lee

(57) ABSTRACT

A multiple-purpose foldable frame includes a plurality of reinforcement rods, an adaptation holder, a plurality of sleeves and arms in conjunction with a plurality of posts and pivot holders. One end of each reinforcement rod is pivoted to a respective pivot holder at the lower end of each post and extending towards the center of the frame at a certain inclination with another end of the reinforcement rod pivoted to the adaptation rod. Each sleeve is inserted onto a respective post. One end of each arm is pivoted to a respective sleeve and another end to a respective reinforcement rod. Each arm is provided with a track to hold onto the reinforcement rod.

2 Claims, 9 Drawing Sheets

MULTI-PURPOSE FOLDABLE FRAME

BACKGROUND OF THE INVENTION (a) Field of the Invention

The present invention relates to a multiple-purpose foldable frame, and more particularly, to one that the posts of the frame when stretching out are further supported by reinforcement tubes and support tubes so to bear heavier load.

(b) Description of the Prior Art

As illustrated in FIG. 8 of the accompanying drawings, a conventional support structure essentially comprises four posts (7) each being retractable for a certain range, and a pair of connection rods (8), crossing over each other at their center points, is connected to two abutted posts (7). Each connection rod (8) is pivoted to the upper end of a respective post (7) and to the lower end of another post (7) to constitute a rectangular frame. Each post (7) is composed of an inner tube (71) inserted into an outer tube (72) for the post (7) to become retractable. An L-shaped pivot holder (9) is each provided to the upper end and the lower end of each post (7). A hole is provided at the center of each pivot holder (9) to receive insertion of the post (7), and two recesses are respectively provided on both side ends on the pivot holder (9) to pivot respectively the upper end and the lower end from the cross connection rods (8) so to allow them to stretch out. The length of each post (7) is vertically reduced as the cross connection rods (8) stretch out to immediately form a rectangular frame ready for covering up with canvas or bag to become a foldable desk or bed, and garbage bag whichever requires a foldable frame to stretch out.

However, the frame of the prior art could barely hold heavier load from the canvas or bag fixed on the top of the frame. The post (7) is vulnerable to be curved and deformed, and in gravid circumstances, the entire frame may accidentally collapse to threaten safe use of the frame.

SUMMARY OF THE INVENTION

The primary purpose of the present invention is to provide a multiple-purpose foldable frame. To achieve the purpose, the present invention essentially comprises a plurality of posts, scissor-like linking rod sets, first pivot holders and second pivot holders. Wherein, the posts are alternatively erected with each post having at its upper end and lower end respectively provided with the first and second pivot holders. Each scissor-like linking rod set is respectively pivoted to two abutted posts. The frame further comprises a plurality of reinforcement rods and an adaptation holder. One end of each reinforcement rod pivoted to a respective second pivot holder at the lower end of each post. Each reinforcement rod inclines for a proper angle towards the center of the frame. Another end of each reinforcement rod is pivoted to the adaptation holder so that one end of the reinforcement rod holds against the bottom of the second pivot holder while another end holds against the adaptation holder for providing reinforcement effects for the frame.

Another purpose of the present invention is to provide a multiple-purpose foldable frame, wherein, the frame further comprises a plurality of sleeves and arms. Each sleeve is inserted onto a respective post. One end of each arm is pivoted to a respective sleeve, and another end of each arm is pivoted to a respective reinforcement rod. A track is provided on the arm for it to hold against the reinforcement rod to provide additional support effect for the frame.

BRIEF DESCRIPTION OF THE DRAWINGS

FIG. 6 is a perspective view of the present invention when folded in.

FIG. 7 is a view showing a local part of the present invention when folded in.

DETAILED DESCRIPTION OF THE PREFERRED EMBODIMENTS

Figure 1:
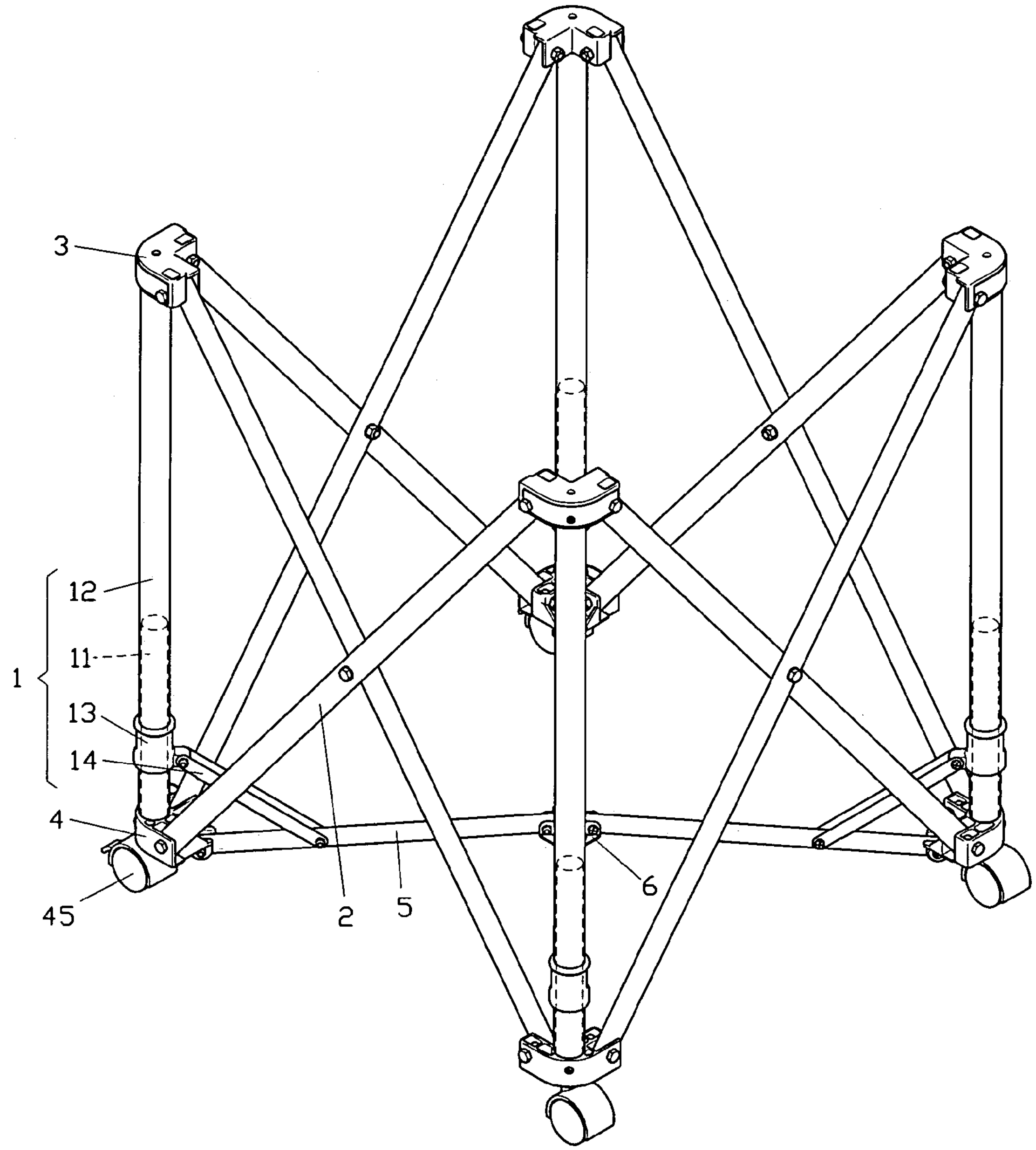
FIG. 1 is a perspective view of the present invention.

As shown in FIG. 1, a multiple-purpose foldable frame of the present invention comprises four posts (1) and four scissor-like linking rod sets (2). The four scissor-like linking rod sets (2) are secured between respective adjacent pairs of posts (1).

The four posts (1) define the four corners of the frame. Each post (1) has a first pivot holder (3) on the top and a second pivot holder (4) on the bottom thereof. Each post (1) is composed of an inner tube (11) and an outer tube (12). A sleeve (13) is inserted onto each post (1) close to the lower end of the outer tube (12). Each first pivot holder (3) and second pivot holder (4) is provided to the upper end of the outer tube (12) and the lower end of the inner tube (11), respectively.

Figure 2:
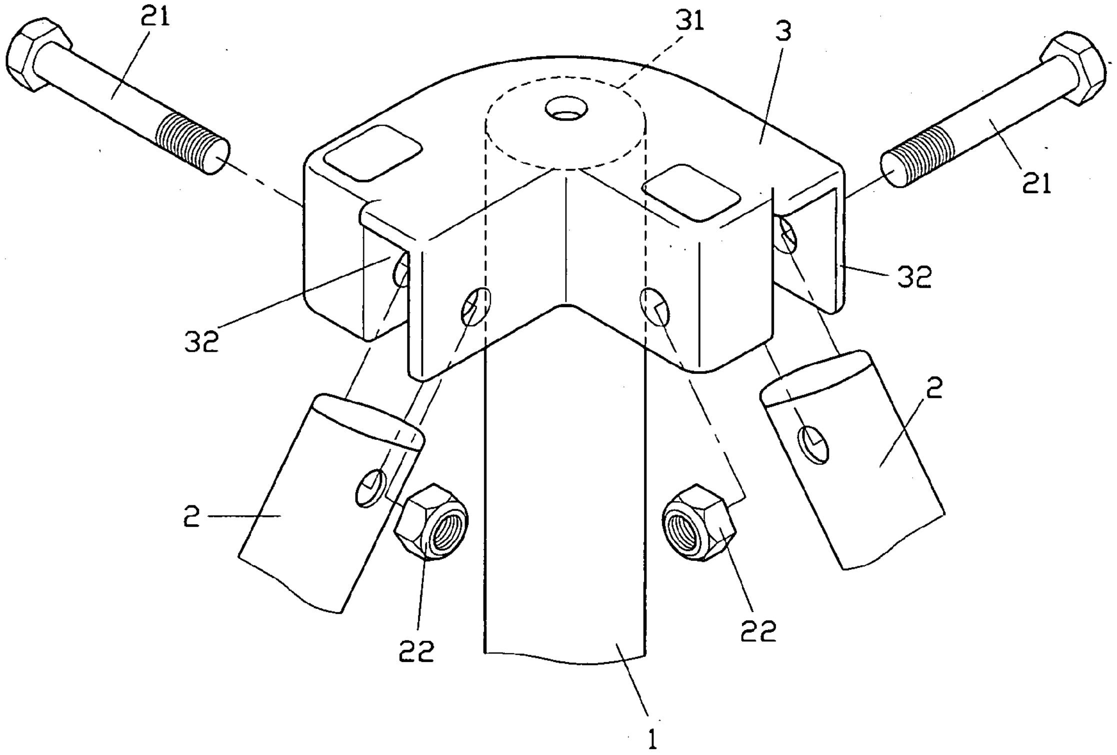
FIG. 2 is an exploded view of a first pivot holder of the present invention.
Figure 3:
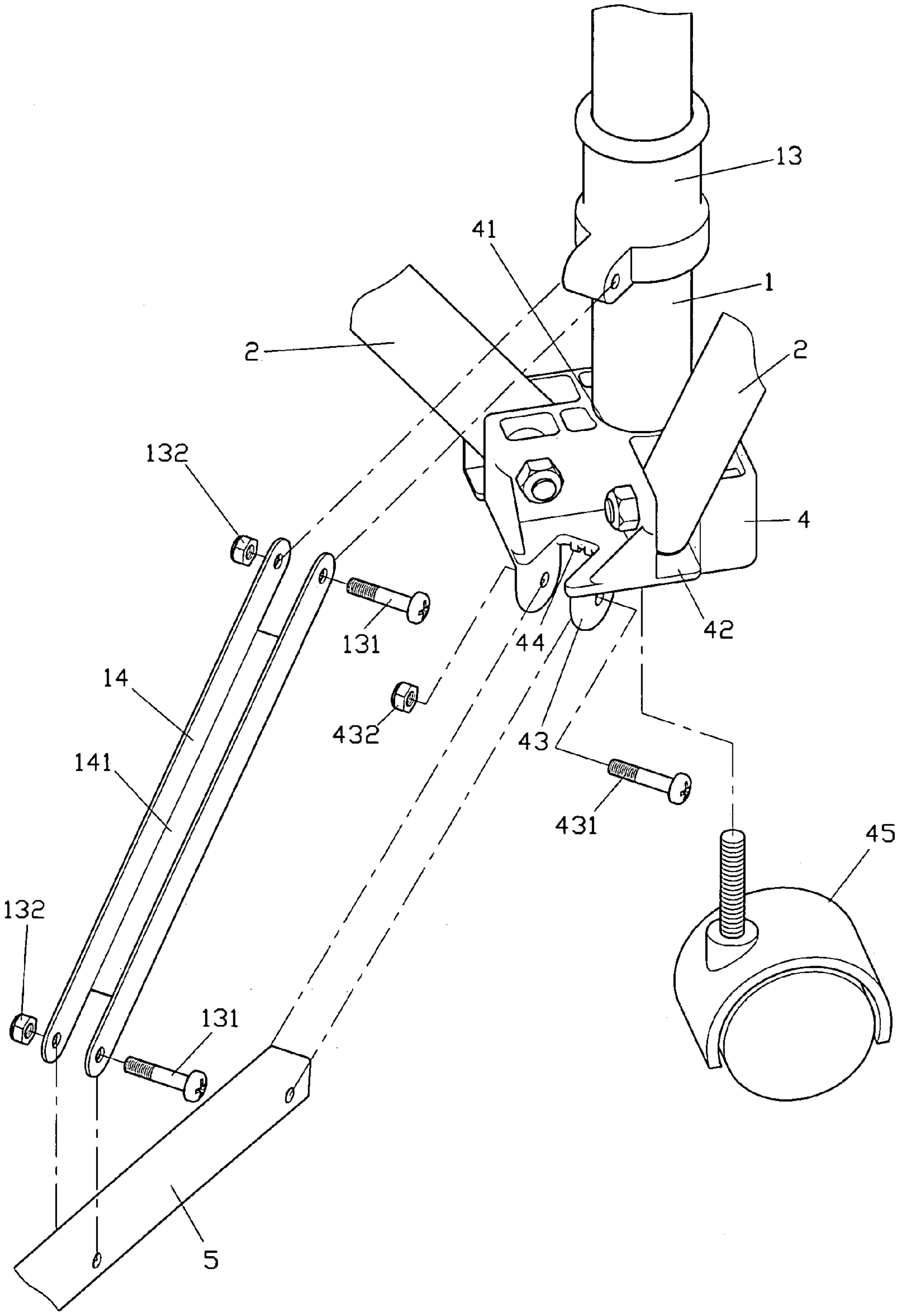
FIG. 3 is an exploded view of a second pivot holder of the present invention.

Referring to FIGS. 2 and 3, an insertion hole (31) is provided at the center of each first pivot holder (3) to receive insertion of a respective post (1). Both sides of each first pivot holder (3) are respectively provided with two recesses (32) to secure upper ends of two adjacent scissor-like linking rod sets (2) with bolts (21) and nuts (22). An insertion hole (41) is provided at the center of each second pivot holder (4) to receive insertion of a respective post (1). Both sides of each second pivot holder (4) are respectively provided with two recesses (42) to secure lower ends of two adjacent scissor-like linking rod sets (2). A pair of pivoting lugs (43) extends downwardly from a surface between the two recesses (42) of each second pivot holder (4) to pivot one end of a respective reinforcement rod (5) with a bolt (431) and a nut (432). A retainer (44) protrudes from the surface between the two pivoting lugs (43) of the second pivot holder (4). A caster (45) is pivoted to the bottom of each second pivot holder (4) to improve mobility of the frame.

One end of an arm (14) is pivoted to the sleeve (13) on the outer tube (12) of each post (1) by means of a bolt (131) and a nut (132). The arm (14) is a U-shaped rod provided at its center a track (141). Another end of the arm (14) is pivoted with another bolt (131) and another nut (132) to a respective reinforcement rod (5) with the track (141) of the arm (14) directly resting on the reinforcement rod (5) when the frame stretches out.

Figure 4:
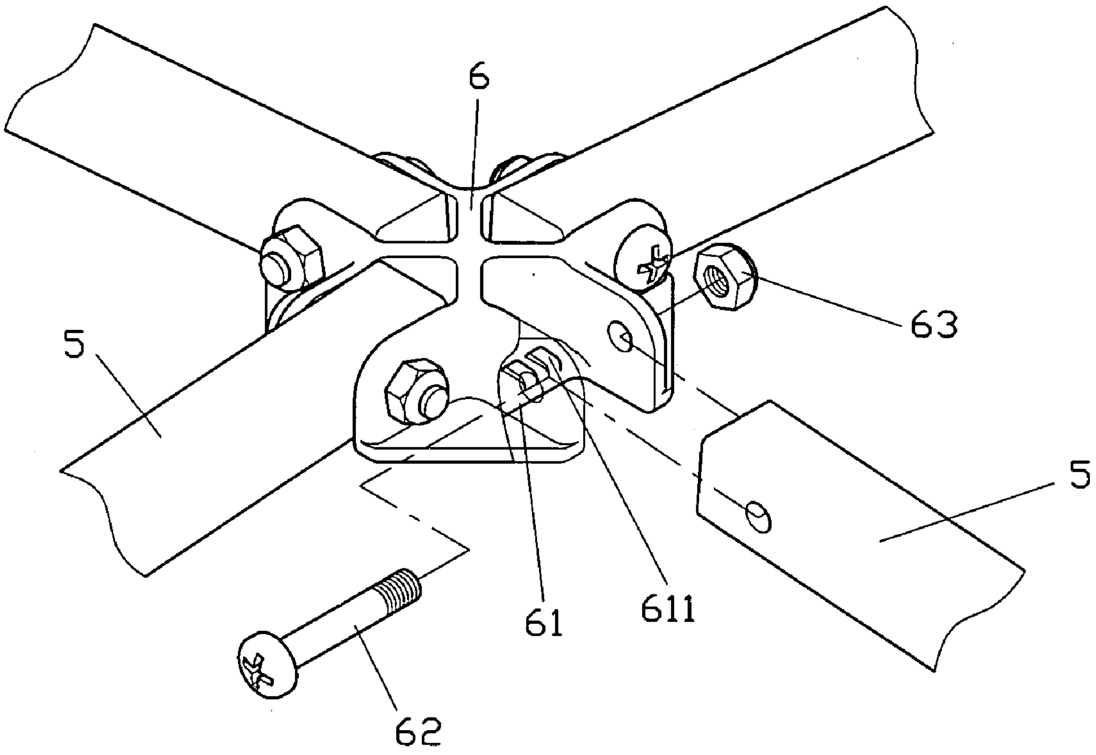
FIG. 4 is an exploded view of an adapter holder of the present invention.

Now also referring to FIG. 4, another end of each reinforcement rod (5) is pivoted to an adaptation holder (6). Four pivoting channels (61) are provided to the adaptation holder (6) to respectively pivot one reinforcement rod (5) by means of a bolt (62) and a nut (63). A stopper (611) protrudes in each pivoting channel (61).

Figure 5:
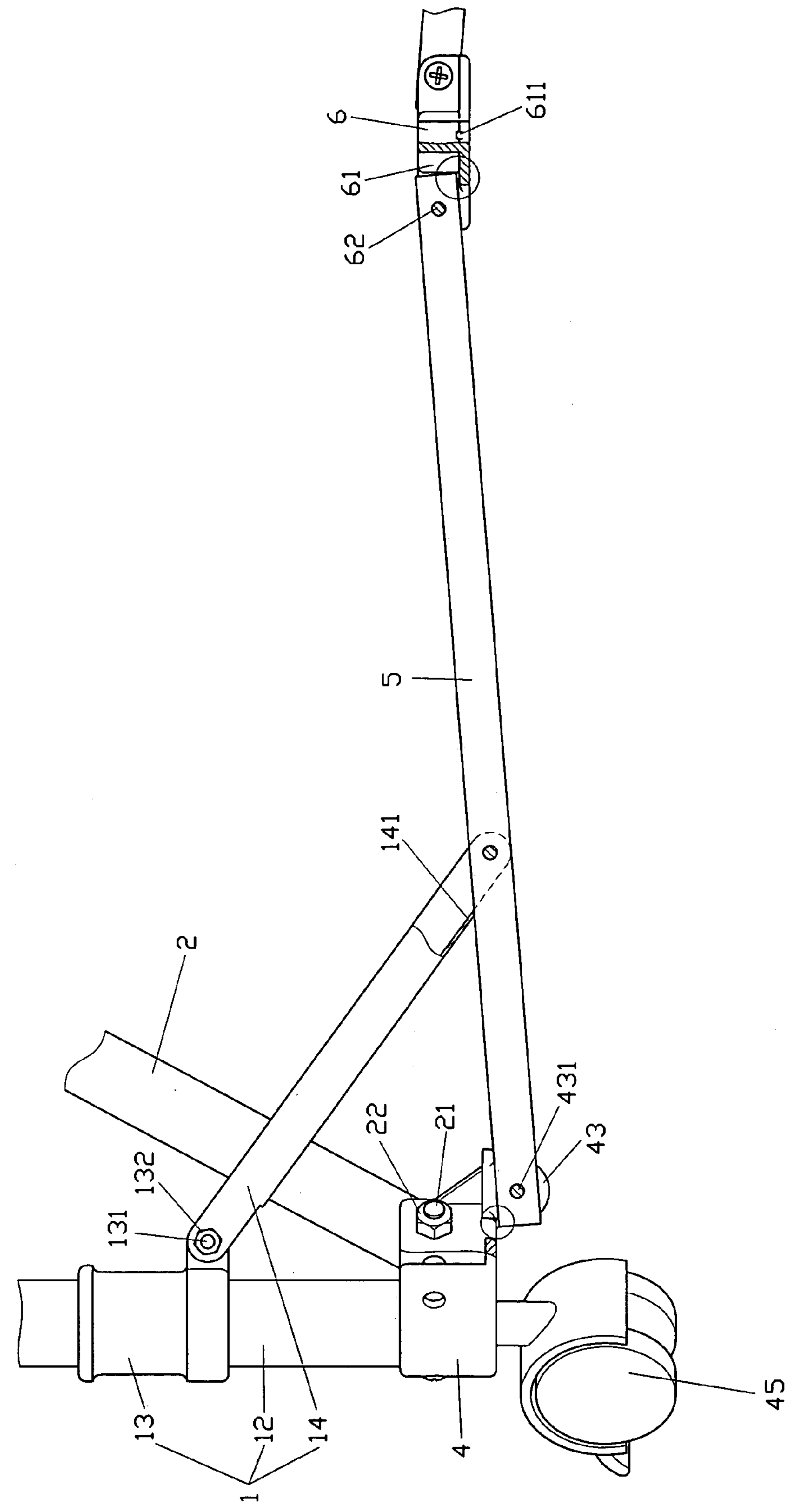
FIG. 5 is a side view showing a local part of the present invention in its stretching out status.
Figure 5A:
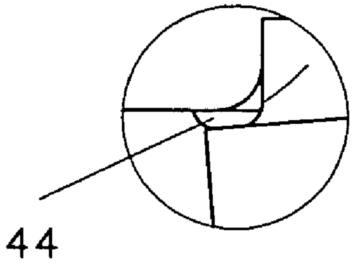
FIG. 5A is a sectional view showing a local part of the present invention in its stretching out status.
Figure 5B:
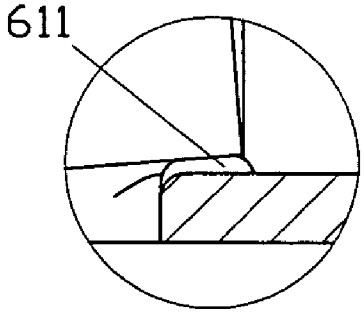
FIG. 5B is another sectional view showing a local part of the present invention in its stretching out status.

When assembled as illustrated in FIG. 1, when the four scissor-like linking rod sets (2) stretch out, the four posts (1) move outwardly. The reinforcement rod (5) pivoted to the second pivot holder (4) at the lower end of each post (1) is fully stretched out due to that the post (1) moves outwardly. As illustrated in FIGS. 5, 5A, and 5B, two ends of each reinforcement rod (5) respectively hold against the retainer (44) of the second pivot holder (44) and the stopper (611) of the adaptation holder (6), so that each reinforcement rod (5) indicates an extension at a certain inclination to be pivoted to the pivoting channel (61) of the adaptation holder (6) at the center to all four reinforcement rods (5). The sleeve (13) inserted onto each post (1) slides down close to the bottom of the outer tube (12) and has the arm (14) pivoted to the sleeve (13) to extend at a certain inclination to hold against the reinforcement rod (5) with the track (141) firmly holding against the reinforcement rod (5) to provide reinforcement support effects for each post (1) and reinforcement rod (5). Accordingly, even when the entire frame is subject to a heavier load, a frame structure provides firm support by all the posts (1), and the reinforcement rods (5) and the arms (14) pivoted at the bottom of the frame.

Furthermore, the frame is given excellent mobility to be pushed around as desired since the caster (45) is each pivoted to the bottom of the second pivot holder (4).

Figure 6:
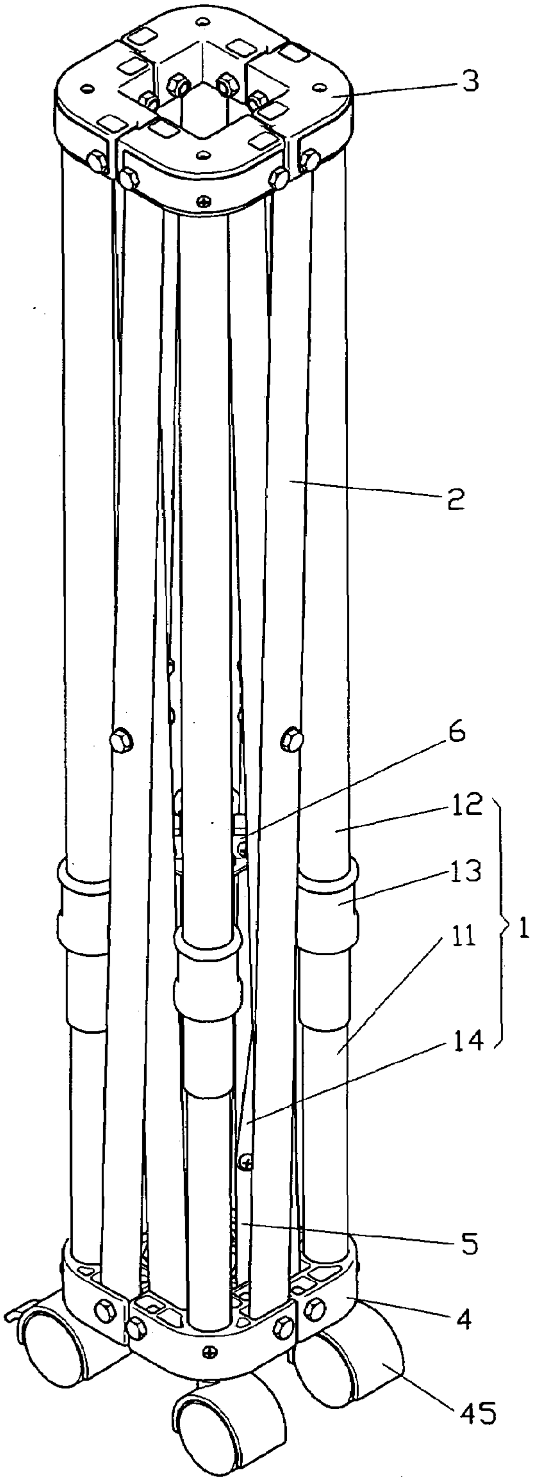
Figure 7:
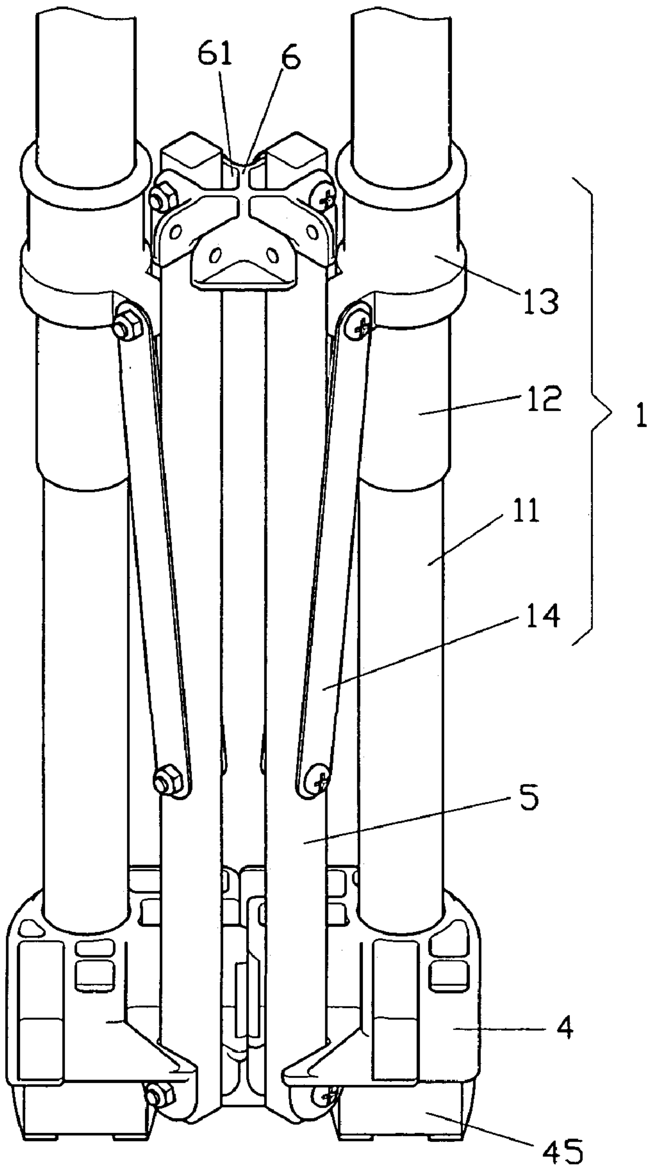
Figure 8:
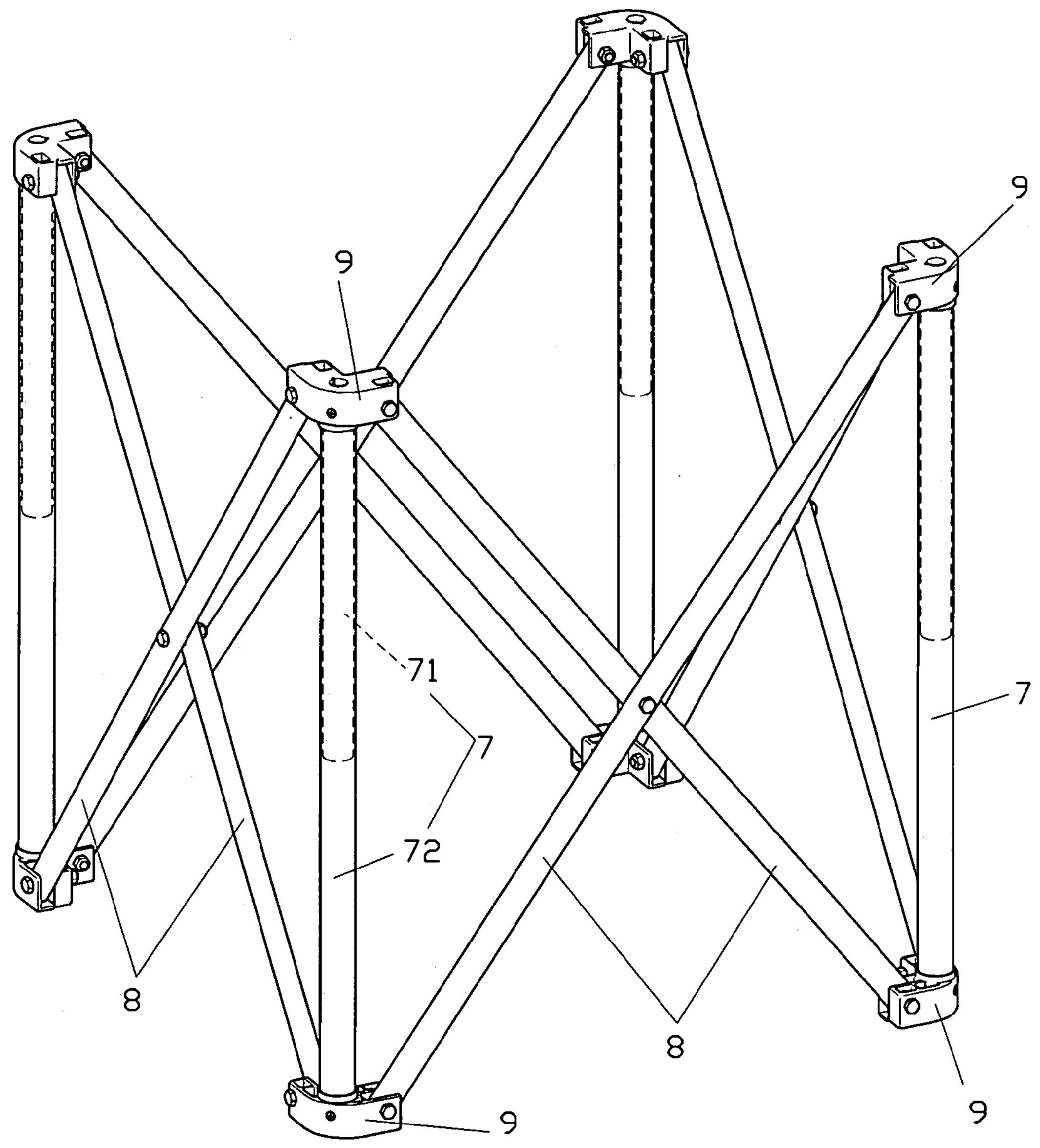
FIG. 8 (PRIOR ART)
FIG. 8 is a perspective view showing a prior art in its stretching out status.

When the frame is collapsed for storage as illustrated in FIGS. 6 and 7, each reinforcement rod (5) is lifted up by the adaptation holder (6) and rests on the peripheral of the post (1), then all four posts (1) close in on one another to allow the inner tuber (11) and the outer tube (12) extending vertically with each arm (14) extending at a certain inclination to hold onto the peripheral of the post (1) and the reinforcement rod (5) fully standing vertically and cling to each other with the post (1) while the four first pivot holders (3) at the upper ends of the four posts (1), and the four second pivot holders (4) at the lower ends of the four posts (1) respectively form a square to significantly reduce the size though with a mild increase in height for easy storage.

I claim:

1. A multiple-purpose foldable frame comprising:

four posts, four linking rod sets each having cross-coupled rods, four first pivot holders, and four second pivot holders, said posts standing with a certain spacing between any two abutted posts with a respective first pivot holder and a respective second pivot holder provided to an upper end and a lower end of each post, and said linking rod sets being pivoted to said first and second pivot holders;

said foldable frame further comprising reinforcement rods and an adaptation holder, one end of each reinforcement rod being pivoted to said respective second pivot holder of each said post, and another end of each said said reinforcement rod being pivoted to said adaptation holder, at least one of said reinforcement rods having an arm coupled to an intermediate portion thereof for support relative to one said post.

2. A multiple-purpose foldable frame comprising:

four posts, four linking rod sets each having cross-coupled rods, four first pivot holders, and four second pivot holders, said posts standing with a certain spacing between any two abuffed posts with a respective first pivot holder and a respective second pivot holder provided to an upper end and a lower end of each post, and said linking rod sets being pivoted to said first and second pivot holders;

said foldable frame further comprising reinforcement rods and an adaptation holder, one end of each reinforcement rod being pivoted to a respective second pivot holder of each post, and another end of each reinforcement being pivoted to said adaptation holder;

a plurality of sleeves and arms; each sleeve being inserted onto a respective said post; one end of each arm being pivoted to a respective sleeve, and another end of each arm being pivoted to a respective said reinforcement rod and a track being provided on each said arm for holding against the reinforcement rod.

* * * * *